(12) United States Patent
Chow et al.

(10) Patent No.: US 7,280,484 B1
(45) Date of Patent: Oct. 9, 2007

(54) NETWORK STATE DIAGNOSTICS FOR A HOME PHONELINE NETWORKING ALLIANCE MEDIA ACCESS CONTROLLER (HPNA MAC)

(75) Inventors: Peter K. Chow, San Jose, CA (US); Kishore Karighattam, Cupertino, CA (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 883 days.

(21) Appl. No.: 10/108,157

(22) Filed: Mar. 26, 2002

(51) Int. Cl.
*G06F 11/00* (2006.01)
(52) U.S. Cl. ..................... 370/241; 709/221
(58) Field of Classification Search .............. None
See application file for complete search history.

(56) References Cited

U.S. PATENT DOCUMENTS

| | | | | |
|---|---|---|---|---|
| 5,157,781 A | * | 10/1992 | Harwood et al. | 714/30 |
| 5,369,647 A | * | 11/1994 | Kreifels et al. | 714/736 |
| 6,538,994 B1 | * | 3/2003 | Horspool et al. | 370/230 |
| 6,701,406 B1 | * | 3/2004 | Chang et al. | 710/310 |
| 6,810,520 B2 | * | 10/2004 | Lu et al. | 719/310 |
| 6,839,345 B2 | * | 1/2005 | Lu et al. | 370/365 |
| 6,909,725 B1 | * | 6/2005 | Chow | 370/467 |
| 6,957,283 B2 | * | 10/2005 | Dhir et al. | 710/10 |
| 2002/0165974 A1 | * | 11/2002 | Chow et al. | 709/230 |
| 2003/0018821 A1 | * | 1/2003 | Chow et al. | 709/250 |
| 2003/0069947 A1 | * | 4/2003 | Lipinski | 709/220 |
| 2003/0145075 A1 | * | 7/2003 | Weaver et al. | 709/223 |

OTHER PUBLICATIONS

"Interface Specification for HomePNA 2.0 10 M8 Technology 2.07.07," Home Phoneline Networking Alliance, 1999, pp. 1-81.

* cited by examiner

*Primary Examiner*—Hassan Kizou
*Assistant Examiner*—Brian Roberts
(74) *Attorney, Agent, or Firm*—Winstead PC

(57) ABSTRACT

Aspects for performing localized diagnostics in a station of a home phoneline networking alliance (HPNA) network are described. The aspects include providing a network state and control register comprising a plurality of bits to indicate status of a network state machine of an HPNA media access controller (MAC). A test mode bit is also provided as one of the plurality of bits in the network state and control register. The test mode bit allows overriding of one or more other bits in the network state and control register to direct changes to the network state machine logic state and diagnose performance in response to the changes.

15 Claims, 4 Drawing Sheets

Network State Control and Status Register    300

| Bit | Name | Description | Read/Write | Default Value (hex) |
|---|---|---|---|---|
| 15 | NT State Test Mode (NT_TEST) | This bit is for the Network State Testmode. Bit 3 to bit 5 (V1_DETECTED_P0/1,V1_SIGNALED) will be writable if this bit is set to "1". | R/W | 0 |
| 14 | VIM2Mode(MODEVIM2) | This register bit is currently Reserved. | R | 0 |
| 13 | Config VIM2 (CONFIG_VIM2) | This register bit is currently Reserved. | R/W | 0 |
| 12 | Force Gapped 10M8 only (FORCE_GAP10M8) | This register bit is currently Reserved. | R/W | 0 |
| 11 | Support Gapped 10M8(SUPPORT_GAP10M8) | This register bit is currently Reserved. | R/W | 0 |
| 10:8 | Reserved | Reserved | R | 0h |
| 7 | 10M8 Mode (MODE1M8) | This status bit will be set to "1" if the station is in 10M8 mode. This bit is read only during normal operation. | R | 0 |
| 6 | 1M8 Mode (MODE10M8) | This status bit will be set to "1" if the station is in 1M8 mode. This bit is read only during normal operation. | R | 0 |
| 5 | V1_SIGNALED (V1_SIGNALED) | This status bit will be set to "1" if 1M8 frame with PCOM Station type = 2 is received or transmitted. This status bit will be cleared to "0" if a sixty second period elapses without receiving or transmitting any frame with PCOM Station Type = 2. This bit is read only during normal operation, and can be writable only if bit 15 NT State Test Mode is set. | R/W | 0 |
| 4 | V1_DETECTED with PCOM=1 (V1_DETECTED_P1) | This status bit will be set to "1" if 1M8 frame with PCOM Station type = 1 is received while Network State is in 10M8 mode with Link Integrity Status = DOWN. This status bit will be cleared to "0" if a two second period elapses without receiving any frame with PCOM Station Type = 0. This status bit is "OR" with bit 3 of this register to form the final "V1_DETECTED" variable. This bit is read only during normal operation, and can be writable only if bit 15 NT State Test Mode is set. | R/W | 0 |
| 3 | V1_DETECTED with PCOM=0 (V1_DETECTED_P0) | This status bit will be set to "1" if 1M8 frame with PCOM Station type = 0 is received. This status bit will be cleared to "0" if a sixty second period elapses without receiving any frame with PCOM Station Type = 0. This status bit is "OR" with bit 4 of this register to form the final "V1_DETECTED" variable. This bit is read only during normal operation, and can be writable only if bit 15 NT State Test Mode is set. | R/W | 0 |
| 2 | Config V2 (CONFIG_V2) | When this bit is set to "1", it will force the station to be in 10M8 mode. It will defer to Config V1 if bit 1 of this register is set. If the bit 13 Config VIM2 of this register is implemented - When this bit is set to "1", it will force the station to be in 10M8 mode. It will defer to Config V1 if bit 1 of this register is set, or defer to Config VIM2 if bit 13 of this register is set. | R/W | 0 |
| 1 | Config V1 (CONFIG_V1) | When this bit is set to "1", it will force the station to be in 1M8 mode with transmit frame in PCOM Station type =1 if the station has NOT detected a recent 1M8 transmission with PCOM Station Type = 0; or with transmit frame in PCOM Station type =2 if the station has detected a recent 1M8 transmission with PCOM Station Type = 0. It is the highest precedence of the configuration flag. | R/W | 0 |
| 0 | Force V1 PCOM=0 (Force_V1P0) | When this bit is set to "1", it will force the station to be in 1M8 mode with transmit frame in PCOM Station type =0. This bit needs to be "0" for normal operation. This bit is for diagnostic purpose only. All the other Config bits should not be set when this bit is set. | R/W | 0 |

Fig. 3

NETWORK STATE DIAGNOSTICS FOR A HOME PHONELINE NETWORKING ALLIANCE MEDIA ACCESS CONTROLLER (HPNA MAC)

FIELD OF THE INVENTION

The present invention relates to home phoneline networking alliance (HPNA) networks, and more particularly to network state diagnostics testing within a station of an HPNA network.

BACKGROUND OF THE INVENTION

As the personal computer (PC) has become more prevalent as a mass consumer item, many people have multiple PCs in their houses. With multiple PCs, it becomes desirable to network the computer together for communication with each other. Having the computers connected in a network allows many advantages, including the ability to share a single printer between computers, use a single Internet connection, share files, play games that allow multiple users at different computers, and send the output of a device like a DVD player or Webcam to the other computer(s).

A networking approach that utilizes phone lines within a home has been developed based on the specifications of the Home Phoneline Networking Alliance (HPNA) to achieve such communication among multiple computers within a home environment. The HomePNA, as it is commonly called, is regarded generally as easy to install, inexpensive and fast, without requiring any additional wiring, since the phone lines already present in the home are used. HomePNA operates using a method known as Frequency Division Multiplexing (FDM), which allows voice and data to travel on the same wires without interfering with each other, since a standard phone line has enough room to support voice, a high-speed DSL modem, and a home phone line network.

The original version of the HPNA standard, HPNA 1.0, operated at a 1 Mbps (megabits per second) communication rate standard. The current specification, HPNA 2.0, is based on technology that operates at a faster 10 Mbps communication rate standard. In order to support both standards in a single device requires some special considerations.

For example, given the variety of stations capable of being connected to an HPNA network, diagnostics testing of each possible arrangement to ensure proper functioning becomes difficult. Accordingly, a need exists for a technique that allows localized diagnostics testing of a network state machine within an HPNA network. The present invention addresses such a need.

SUMMARY OF THE INVENTION

Aspects for performing localized diagnostics in a station of a home phoneline networking alliance (HPNA) network are described. The aspects include providing a network state and control register comprising a plurality of bits to indicate status of a network state machine of an HPNA media access controller (MAC). A test mode bit is also provided as one of the plurality of bits in the network state and control register. The test mode bit allows overriding of one or more other bits in the network state and control register to direct changes to the network state machine logic state and diagnose performance in response to the changes.

With the added feature of a test mode bit to a control register in a network state machine of an HPNA MAC, the ability to ensure proper functioning in a station is achieved in an efficient and straightforward manner. These and other advantages of the aspects of the present invention will be more fully understood in the following detailed description in conjunction with the accompanying drawings.

BRIEF DESCRIPTION OF THE DRAWINGS

FIG. 3 illustrates a network state and control register that includes a state test bit in accordance with a preferred embodiment of the present invention.

DETAILED DESCRIPTION OF THE INVENTION

The present invention relates to support of diagnostics testing of a network state machine within a station of an HPNA network. The following description is presented to enable one of ordinary skill in the art to make and use the invention and is provided in the context of a patent application and its requirements. Thus, the present invention is not intended to be limited to the embodiment shown, but is to be accorded the widest scope consistent with the principles and features described herein.

Figure 1:
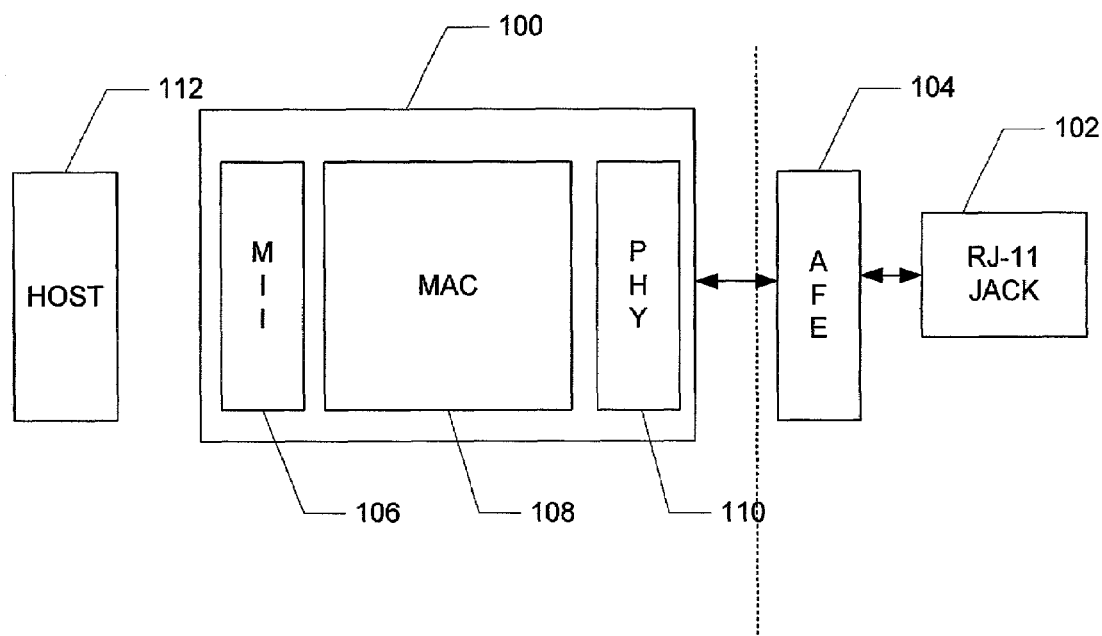
FIG. 1 illustrates a preferred embodiment of a home phone line network in accordance with the present invention.

FIG. 1 illustrates a preferred embodiment of a home phone line network in accordance with the present invention. The preferred embodiment of the network complies with the Home Phoneline Networking Alliance (HPNA) specification version 2.0. The network allows multiple computers to communicate through telephone wires typically installed in residential homes. The network comprises a control chip 100. The chip 100 further comprises a Media Independent Interface (MII) 106, a Media Access Control (MAC) 108, and a Physical Layer (PHY) 110. The chip 100 implements the HPNA 2.0-specification. The chip 100 receives a signal containing data packets through the telephone wires via a phone jack 102. There is an analog front end (AFE) 104 which processes the Jo signal between the chip 100 and the telephone wires. The chip 100 then processes the packets received in the signal from the AFE 104, and outputs a signal to the Host MAC 112.

Figure 2:
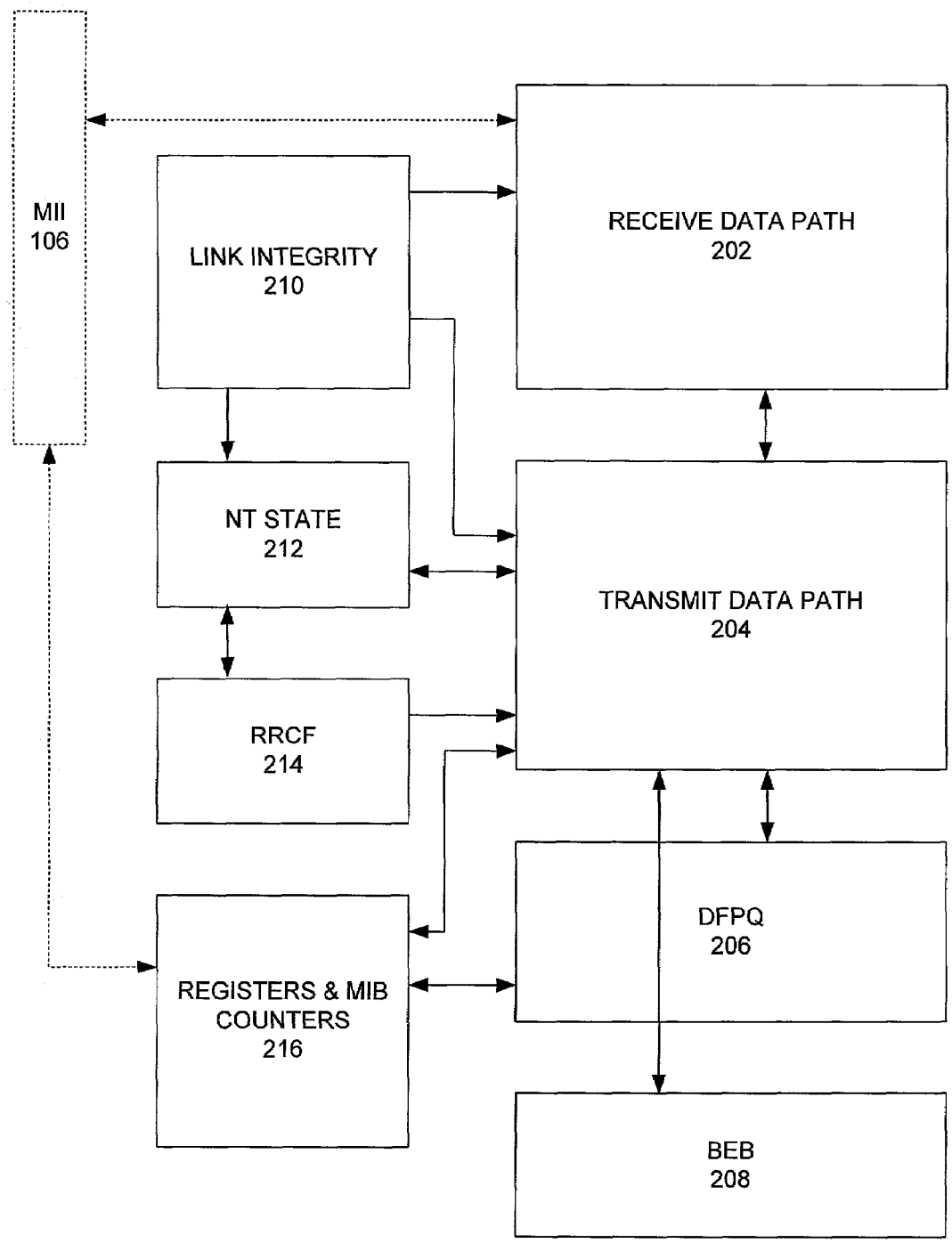
FIG. 2 illustrates a block diagram of operational elements of a preferred embodiment of the MAC 108 in accordance with the present invention.

FIG. 2 illustrates a block diagram of operational elements of a preferred embodiment of the MAC 108 in accordance with the present invention. As shown, the MAC 108 includes a Receive Data Path 202, a Transmit Data Path 204, a Distributed Fair Priority Queuing (DFPQ) 206, a Binary Exponential Backoff (BEB) 208, a Link Integrity 210, a Network State 212, a Rate Request Control Frame (RRCF) 214, and a plurality of registers and Management Information Base (MIB) counters 216.

The Receive Data Path 202 receives data packets from the PHY 110 and sends data packets to the MII 106. In the preferred embodiment, after each data packet sent by the Receive Data Path 202, another packet, referred to herein as a "frame status frame", is sent immediately following. The frame status frame contains certain status information required by subsequent processes.

The Transmit Data Path 204 receives data packets from the MII 106 and transmits them to the PHY 110.

The DFPQ 206 and the BEB 208 provide collision resolution. The HPNA 2.0 specification supports both a 10 megabit per second (mbps) data rate and a 1 mbps data rate. The DFPQ 206 provides collision resolution for the 10 mbps data rate, while the BEB 208 provides collision resolution for the 1 mbps data rate. In the preferred embodiment, the PHY 110 will provide a collision detect signal. Either the DFPQ 206 or the BEB 208 will then attempt to resolve the collision.

The Link Integrity 210 monitors the physical network conditions. In the preferred embodiment, the Link Integrity 210 updates a link status bit in a link register. The Link Integrity 210 also sends link packets in accordance with the HPNA 2.0 specification. The registers and MIB counters 216 provide programmability to the MAC 108 and handle error event counting.

The Network State 212 monitors the current mode of the MAC 108, i.e., whether the MAC 108 is operating in the 10 mbps data rate mode ("10M8") or the 1 mbps data rate mode ("1M8").

The RRCF 214 sends a RRCF signal whenever the MAC 108 transitions between data rates. The RRCF is used to perform the rate negotiation function, i.e., to determine what is the data rate to communicate between different stations in a home phone line network.

In monitoring the current mode of the MAC 108, the Network State 212 utilizes a state machine and a control and status register. Normally, the states detected by the state machine are reflected by read-only bits in the control and status register. In accordance with the present invention, however, the control and status register provides a bit that allows overriding of state bits in the control and status register in order to allow performance of localized diagnostics efficiently within a station. For purposes of this discussion, localized diagnostics refer to testing of the state machine's performance within a single station and without the utilization of a recreation of an entire network structure.

FIG. 3 illustrates a network state control and status register 300 in accordance with the present invention. As shown, the register 300 is a 16-bit register with designations provided for each of the bits 0-15, including the designation of bit 15 as a NT (network) State Test Mode bit. While the register of FIG. 3 represents a preferred embodiment for a 16-bit register, it should be appreciated that this is meant as illustrative and not restrictive, so that other designations and number of bits are possible to provide a network state control and status register with a network state test mode bit in accordance with aspects of the present invention.

Figure 4:
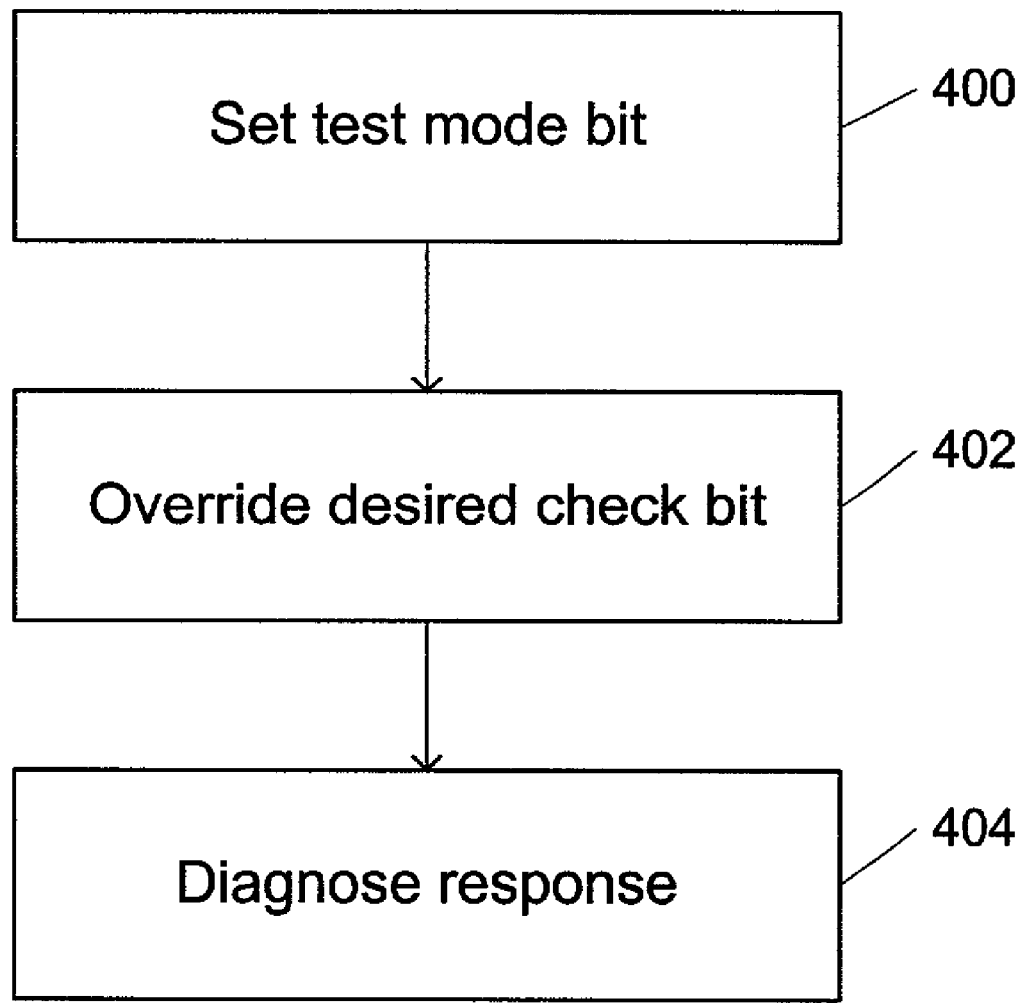
FIG. 4 illustrates a block diagram of a network state diagnostics process in accordance with a preferred embodiment of the present invention.

With a network state control and status register as shown in FIG. 3, a process for localized diagnostics testing within a station can occur, as represented by the flow diagram of FIG. 4. The process initiates with the setting of the state test mode bit (step 400). With the state test mode bit set, the overriding of one of the other bits in the register then occurs (step 402). Referring to FIG. 3, one of the check bits, shown as detection bit 3, detection bit 4, or signaled status bit 5, could be set in step 402. As is further shown, for each of these bits, the description indicates the specifications for the operations to be met once in the set state. Thus, by observing how the network state 212 responds to controlled test signals when one of the bits is in the set state, a diagnosis of how well the network state 212 is meeting these specifications commences, as is well appreciated by those skilled in the art (step 404). In this manner, the ability to test the network state operations occurs locally within a given station. Of course, the process can be repeated, as desired, to test more than one of the bits.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A method for performing localized diagnostics in a station of a home phoneline networking alliance (HPNA) network, the method comprising:

providing a network state and control register comprising a plurality of bits to indicate status of a network state machine of an HPNA media access controller (MAC);

providing a test mode bit as one of the plurality of bits in the network state and control register; and utilizing the test mode bit to allow overriding of one or more other bits in the network state and control register to direct changes to the network state machine logic state and diagnose performance in response to the changes.

2. The method of claim 1 wherein providing a network state and control register further comprises providing a 16-bit register.

3. The method of claim 1 wherein utilizing the test mode bit further comprises setting the test mode bit.

4. The method of claim 3 wherein utilizing with the test mode bit set further comprises overriding one of three check bits.

5. The method of claim 4 wherein overriding one of three check bits further comprises overriding one of a first detection state bit, a second detection state bit, and a signaled status bit.

6. A home phone networking alliance (HPNA) network control chip capable of providing operation in accordance with at least two different data rate standards, the chip comprising:

a media independent interface (MII);

a physical layer (PHY); and a media access control (MAC) coupled between the MII and the PHY, the MAC further comprising a network state machine to monitor which data rate standard the MAC is operating under as indicated by a network state and control register that includes a plurality of bits where a test mode bit of the plurality of bits allows overriding of one or more other bits to direct changes to a state of the network state machine for diagnosing performance in response to the changes.

7. The network control chip of claim 6 wherein the network state and control register further comprises a 16-bit register.

8. The network control chip of claim 6 wherein the test mode allows overriding when in a set state.

9. The network control chip of claim 8 wherein the one or more other bits further comprise one of three check bits.

10. The network control chip of claim 9 wherein the one of three check bits further comprises one of a first detection state bit, a second detection state bit, and a signaled status bit.

11. A method for performing localized diagnostics in a station of a home phoneline networking alliance (HPNA) network, the method comprising:

utilizing a media access controller (MAC) that supports two different data rate standards in a station on the HPNA network;

utilizing a network state machine within the MAC to identify which data rate standard the station is operating under; and performing diagnostics on the MAC locally within the station through a network state control and status register of the network state machine.

12. The method of claim 11 wherein performing diagnostics further comprises setting a test mode bit of the network state control and status register.

13. A method for performing localized diagnostics in a station of a home phoneline networking alliance (HPNA) network, the method comprising:

utilizing a media access controller (MAC) that supports two different data rate standards in a station on the HPNA network;

utilizing a network state machine within the MAC to identify which data rate standard the station is operating under; and performing diagnostics on the MAC locally within the station through a network state control and status register of the network state machine;

wherein performing diagnostics further comprises setting a test mode bit of the network state control and status register;

wherein performing diagnostics further comprises controlling data in each of three check bits in the network state control and status register when the test mode bit is set.

14. The method of claim 13 wherein performing diagnostics further comprises checking for appropriate changes in status in the station based on the controlled data in the check bits.

15. The method of claim 13 wherein the three check bits further comprise first and second detection bits and a signaled status bit.

* * * * *